(12) United States Patent
Yamashita

(10) Patent No.: US 6,463,364 B2
(45) Date of Patent: Oct. 8, 2002

(54) OFFLINE APPARATUS FOR DETECTING ATTITUDE OF ARTIFICIAL SATELLITE IN WIDE-BAND AND METHOD THEREOF

(75) Inventor: Toshiaki Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/942,868

(22) Filed: Aug. 31, 2001

(65) Prior Publication Data

US 2002/0042669 A1 Apr. 11, 2002

(30) Foreign Application Priority Data

Sep. 1, 2000 (JP) ........................................ 2000-265553

(51) Int. Cl.[7] .............................................. B64G 1/32
(52) U.S. Cl. .............................. 701/4; 701/13; 244/164; 244/171
(58) Field of Search .................... 701/13, 1, 4; 244/171, 244/164

(56) References Cited

U.S. PATENT DOCUMENTS 4,883,244 A 11/1989 Challoner et al.
6,266,616 B1 * 7/2001 Needelman ................. 701/222

FOREIGN PATENT DOCUMENTS

| JP | 60-196002 | 10/1985 |
| JP | 2588958 | 12/1996 |
| JP | 2000-142594 | 5/2000 |

* cited by examiner

*Primary Examiner*—William A. Cuchlinski, Jr.
*Assistant Examiner*—Arthur D. Donnell
(74) *Attorney, Agent, or Firm*—McGinn & Gibb, PLLC

(57) ABSTRACT

This invention provides an offline attitude determining apparatus capable of detecting an artificial satellite attitude at a high precision in wide band. Averaging and addition processing are carried out on a low-frequency attitude interpolation signal generated by interpolating a low-frequency attitude detection signal obtained by inputting an attitude angle determination signal generated by a sequential Kalman filter computation device and a high-frequency attitude detection signal obtained by inputting a high-frequency attitude angle sensor detection signal extracted by a high-frequency attitude angle sensor data extracting device into a band pass filter computation device, so as to generate a high-precision attitude detection signal. By combining the low-frequency attitude detection signal with the high-frequency attitude detection signal with an interpolation processing computation device and an attitude data generator, the attitude can be determined at a high precision in wide band.

6 Claims, 3 Drawing Sheets

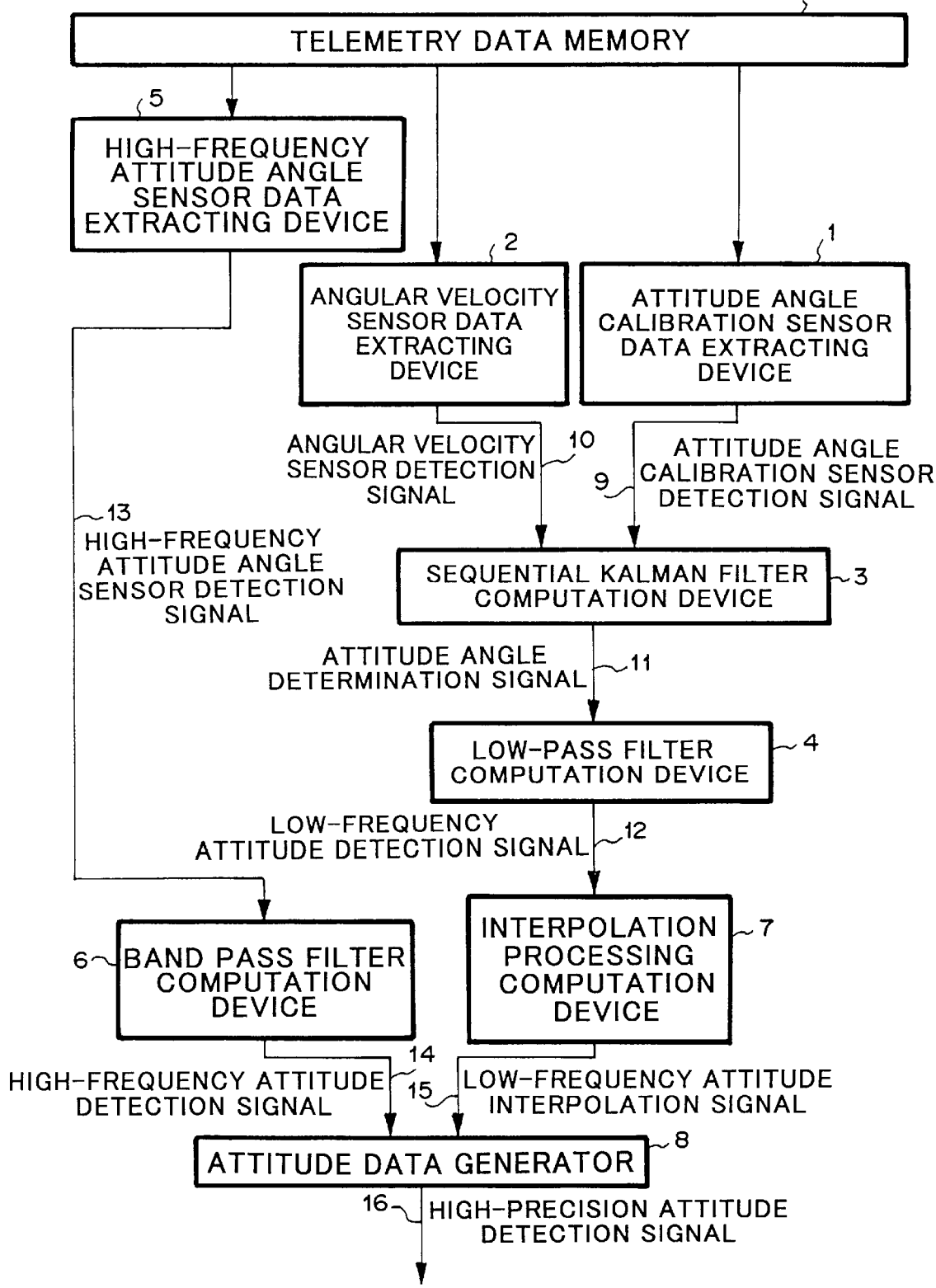

FIG.2

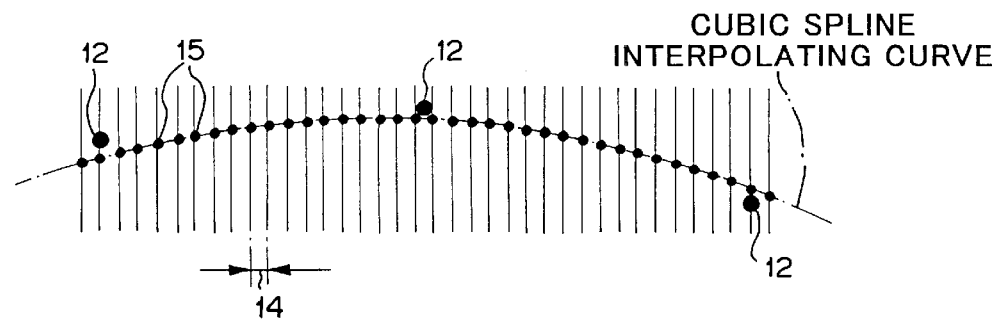

12: LOW-FREQUENCY ATTITUDE DETECTION SIGNAL
14: SAMPLING INTERVAL OF HIGH-FREQUENCY ATTITUDE DETECTION SIGNAL
15: LOW-FREQUENCY ATTITUDE INTERPOLATION SIGNAL

FIG.3

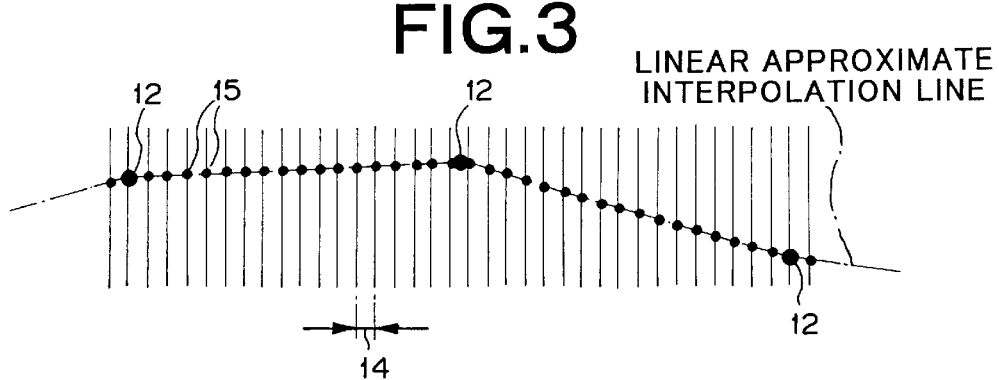

12: LOW-FREQUENCY ATTITUDE DETECTION SIGNAL
14: SAMPLING INTERVAL OF HIGH-FREQUENCY ATTITUDE DETECTION SIGNAL
15: LOW-FREQUENCY ATTITUDE INTERPOLATION SIGNAL

FIG.4

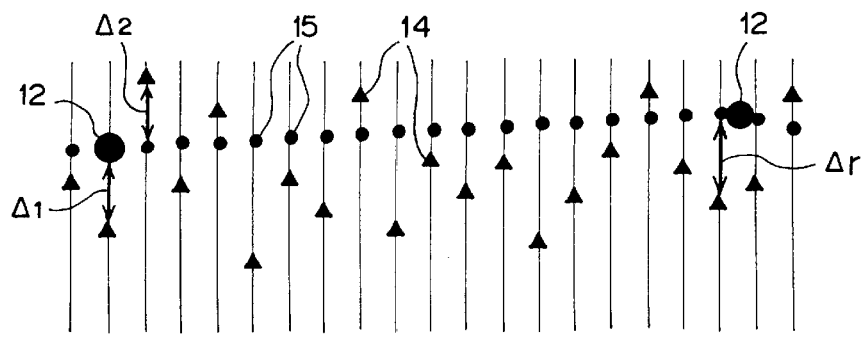

12: LOW-FREQUENCY ATTITUDE DETECTION SIGNAL
▲14: HIGH-FREQUENCY ATTITUDE DETECTION SIGNAL
●15: LOW-FREQUENCY ATTITUDE INTERPOLATION SIGNAL

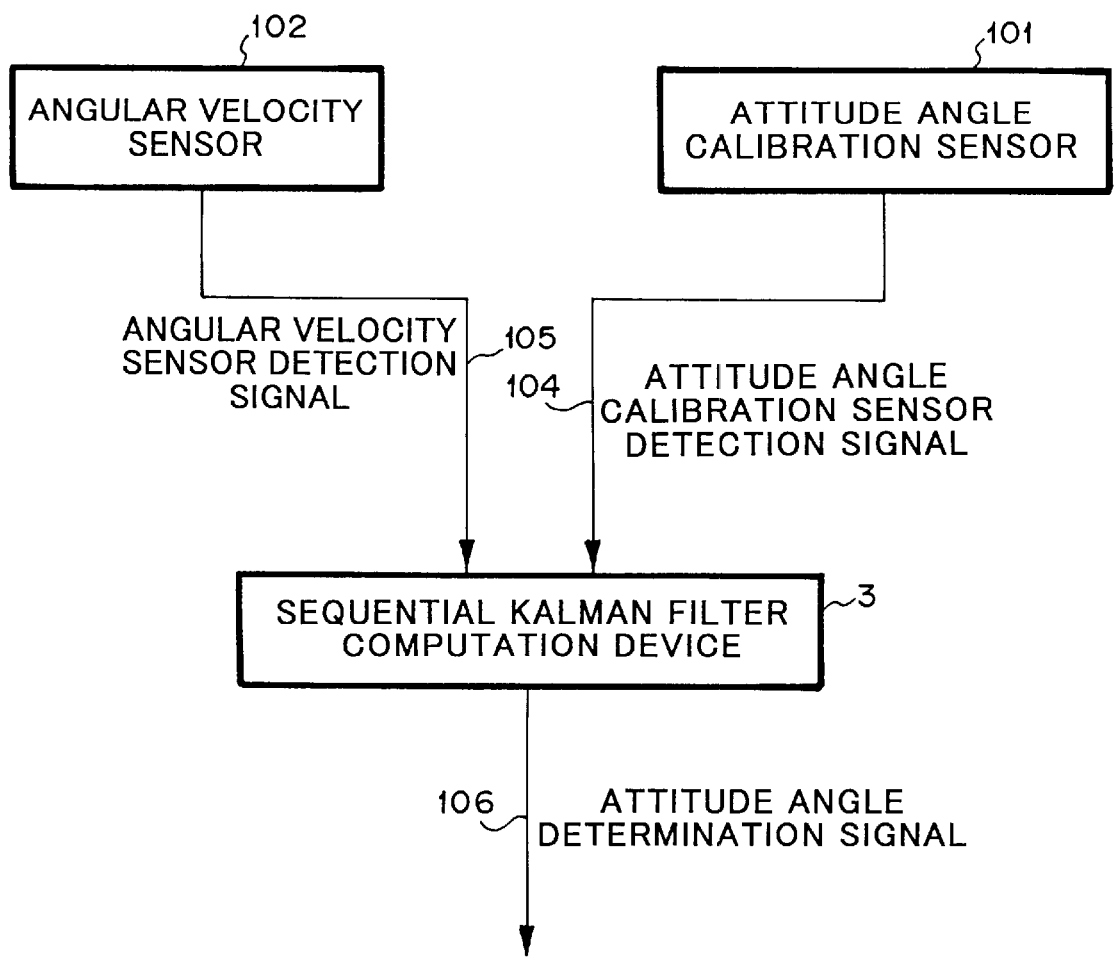

OFFLINE APPARATUS FOR DETECTING ATTITUDE OF ARTIFICIAL SATELLITE IN WIDE-BAND AND METHOD THEREOF

BACKGROUND OF THE INVENTION

1. Field of the Invention

The present invention relates to an attitude angle detecting apparatus for detecting changes in an attitude angle of an artificial satellite in a wide band with ground offline processing at a high precision and a method thereof.

2. Description of the Prior Art

FIG. 5 is a configuration diagram showing an example of a conventional attitude determining apparatus. Reference numeral 101 represents an attitude angle calibration sensor, reference numeral 102 represents an angular velocity sensor, reference numeral 3 represents a sequential Kalman filter computing device, reference numeral 104 represents an attitude angle calibration sensor detection signal, reference numeral 105 represents an angular velocity sensor detection signal and reference numeral 106 represents an attitude angle determining signal.

Referring to FIG. 5, an angular velocity sensor detection signal 105 detected by the angular velocity sensor 102 and an attitude angle calibration sensor detection signal 104 detected by the attitude angle calibration sensor 101 are inputted to the sequential Kalman filter computing device 3 so as to generate an attitude angle determining signal 106 which is an attitude angle estimation value of the artificial satellite. The sequential Kalman filter computing device 3 realizes noise characteristics of the angular velocity sensor 102 (for example, gyroscope) and the attitude angle calibration sensor 101 (for example, star tracker (STT) which is a fixed star sensor) which are loaded on the artificial satellite in the form of a probability model. With that model, noises contained in the angular velocity sensor detection signal 105 and the attitude angle calibration sensor detection signal 104 are estimated and removed so as to generate the attitude angle determining signal 106 of the artificial satellite at a high precision.

Because the conventional attitude determining apparatus as shown in FIG. 5 can be made with a relatively simple structure, it has been originally developed as a processing (i.e., real-time processing) system on board. However, if the angular velocity sensor detection signal 105 and the attitude angle calibration sensor detection signal 104 can be extracted from telemetry data received on ground as time-series data, they can be applied easily to offline processing system. For this reason, the conventional attitude determining apparatus as shown in FIG. 5 has been widely used as an apparatus common among an onboard processing system and a ground processing system.

However, although the attitude angle calibration sensor 101 such as STT generally has an excellent measuring accuracy, its measuring cycle is 10 times longer than the angular velocity sensor 102. Thus, even if the measuring cycle of the angular velocity sensor 102 is improved, there is a limit of detection in frequency band due to an influence of waste time. Although the changes of the artificial satellite attitude can be detected up to high frequency band in case only the angular velocity sensor 102 is used. However, in this case, an influence of noise contained in the angular velocity sensor detection signal 105 is increased, so that the accuracy of the attitude angle determining signal 106 generated by the sequential Kalman filter computing device 3 is deteriorated considerably.

SUMMARY OF THE INVENTION

In order to overcome the aforementioned disadvantages, the present invention has been made and accordingly, has an object to provide an apparatus for detecting an attitude of an artificial satellite in wide-band capable of detecting an artificial satellite attitude in wide band at a high precision.

To achieve the above object, according to a first aspect of the present invention, there is provided an apparatus for detecting an attitude of an artificial satellite comprising: telemetry data memory for storing and holding data from the artificial satellite; an attitude angle calibration sensor data extracting device for extracting an attitude angle calibration sensor detection signal from said telemetry data memory as time-series data; an angular velocity sensor data extracting device for extracting an angular velocity sensor detection signal from the telemetry data memory as time-series data; a sequential Kalman filter computation device for generating an attitude angle determination signal from the attitude angle calibration sensor detection signal and the angular velocity sensor detection signal; a low-pass filter computation device for generating a low frequency attitude detection signal from the attitude angle determination signal; an interpolation processing computation device for generating a low frequency attitude interpolation signal from the low frequency attitude detection signal; a high-frequency attitude angle sensor data extracting device for extracting a high-frequency attitude angle sensor detection signal from the telemetry data memory as time-series data; a band pass filter for generating a high-frequency attitude detection signal from the high-frequency attitude angle sensor detection signal; and an attitude data generator for generating a high-precision attitude detection signal from the low-frequency attitude interpolation signal and the high-frequency attitude angle detection signal.

Under the above-described structure, it is possible to employ a star tracker (STT) as the attitude angle calibration sensor, a gyroscope as the angular velocity sensor, and an angle displacement sensor (ADS) using liquid as the high-frequency attitude angle sensor.

According to a second aspect of the present invention, there is provided the apparatus for detecting an attitude of an artificial satellite according to the first aspect, wherein the interpolation processing computation device generates the low-frequency attitude interpolation signal by interpolating the low-frequency attitude detection signal by cubic spline interpolation.

According to a third aspect of the present invention, there is provided the apparatus for detecting an attitude of an artificial satellite according to the first aspect, wherein the interpolation processing computation device generates the low-frequency attitude interpolation signal by carrying out linear approximate interpolation on the low-frequency attitude detection signal, and the attitude data generator generates the high-precision attitude detection signal by interpolating the high-frequency attitude angle detection signal using an interpolation value of the low-frequency attitude detection signal outputted from the interpolation processing computation device.

BRIEF DESCRIPTION OF DRAWINGS

FIG. 1 is a diagram showing the structure of an offline apparatus for detecting an attitude of an artificial satellite in wide-band according to a first embodiment of the present invention;

FIG. 2 is a schematic diagram showing the relationship between cubic spline interpolation to a low-frequency attitude detection signal and a low-frequency attitude interpolation signal according to a second embodiment of the present invention;

FIG. 3 is a schematic diagram showing the relationship between linear approximate interpolation to a low-frequency attitude detection signal and a low-frequency attitude interpolation signal in an interpolation processing computation device according to a third embodiment of the present invention;

FIG. 4 is a schematic diagram showing the relationship between a high-frequency attitude detection signal to a low-frequency attitude detection signal and a low-frequency attitude interpolation signal in an attitude data generator according to a third embodiment of the present invention; and FIG. 5 is a diagram showing the structure of an offline apparatus for detecting an attitude of an artificial satellite in wide-band attitude detecting apparatus of an artificial satellite according to a conventional example.

DESCRIPTION OF THE PREFERRED EMBODIMENTS

Next, the preferred embodiments of the present invention will be described with reference to the accompanying drawings.

FIG. 1 is a configuration diagram showing a first embodiment of an offline apparatus for detecting an attitude of an artificial satellite in wide-band according to the present invention. The offline wide-band attitude detecting apparatus as shown in FIG. 1 comprises a telemetry data memory 20, an attitude angle calibration sensor data extracting device 1, an angular velocity sensor data extracting device 2, a sequential Kalman filter computation device 3, a low-pass filter computation device 4, a high-frequency attitude angle sensor data extracting device 5, a band pass filter computation device 6, an interpolation processing computation device 7 and an attitude data generator 8. Reference numeral 9 represents an attitude angle calibration sensor detection signal. Reference numeral 10 represents an angular velocity sensor detection signal. Reference numeral 11 represents an attitude angle determination signal. Reference numeral 12 represents a low-frequency attitude detection signal. Reference numeral 13 represents a high-frequency attitude angle sensor detection signal. Reference numeral 14 represents a high-frequency attitude detection signal. Reference numeral 15 represents a low-frequency interpolation signal. Reference numeral 16 represents a high-precision attitude detection signal.

The offline apparatus for detecting an attitude of an artificial satellite in wide-band in this embodiment, as shown in FIG. 1, carries out averaging and addition processings on a low-frequency attitude interpolation signal 15 and a high-frequency attitude detection signal with the attitude data generator 8, so as to generate a high-precision attitude detection signal 16. The low-frequency attitude interpolation signal 15 is generated by interpolating a low-frequency attitude detection signal 12 obtained by inputting an attitude angle determination signal 11 generated by the same sequential Kalman filter computation device 3 as a conventional attitude determining device into the low pass filter computation device 4. The high-frequency attitude detection signal 14 is obtained by inputting a high-frequency attitude angle sensor detection signal 13 extracted by the high-frequency attitude angle sensor data extracting device 5 into the band pass filter computation device 6.

In the ground system, telemetry data transmitted periodically from an artificial satellite to a ground station is stored in the telemetry data memory 20 as continuous time-series data. Then, the attitude angle calibration sensor data extracting device 1, the angular velocity sensor data extracting device 2, and the high-frequency attitude angle sensor data extracting device 5 respectively extract the attitude angle calibration sensor detection signal 9, the angular velocity sensor detection signal 10 and the high-frequency attitude angle sensor detection signal 13 from the telemetry data stored in the telemetry data memory 20.

At this time, the sequential Kalman filter computation device 3 carries out propagation processing on the angular velocity sensor detection signal 10 with the attitude angle calibration sensor detection signal 9, used as an attitude angle calibration data, generated by the attitude angle calibration sensor data extracting device 1 so as to generate the attitude angle determination signal 11. Further, the attitude angle determination signal 11 is inputted to the low-pass filter computation device 4 (cut-off frequency $\omega_c$) so as to obtain the low-frequency attitude detection signal 12. After that, by carrying out interpolation processing on missing data between sampling cycles, the low-frequency interpolation signal 15 having a sampling cycle corresponding to the high-frequency attitude angle sensor detection signal 13 obtained at a short sampling cycle is generated.

On the other hand, by inputting the high-frequency attitude angle sensor detection signal 13 generated by the high-frequency attitude angle sensor data extracting device 5 into the band pass filter computation device 6 in which cut-off frequency $\omega_1$ on the side of low frequency side and cut-off frequency $\omega_h$ on the side of high frequency are set, the high-frequency attitude detection signal 14 is generated. The cut-off frequency $\omega_1$ on the side of low frequency of the band pass filter computation device 6 is set such that the relation with the cut-off frequency $\omega_c$ set to the low-pass filter computation device 4 is $\omega_1 = \omega_c$.

Finally, the low-frequency interpolation signal 15 generated by the interpolation processing computation device 7 and the high-frequency attitude detection signal 14 generated by the band pass filter computation device 6 are inputted to the attitude data generator 8. Consequently, a high precision attitude angle of wide-band is generated with these two signals so as to generate the high-precision attitude detection signal 16.

The offline apparatus for detecting an attitude of an artificial satellite in wide-band of the present invention restricts its application scope to offline processing system based on telemetry data from the satellite received on the ground. The apparatus generates the attitude angle determination signal 11 which is data having a relatively long sampling period from the attitude angle calibration sensor detection signal 9 extracted from the telemetry data memory 20 and the angular velocity sensor detection signal 10. After that, the low-frequency interpolation signal corresponding to the high-frequency attitude detection signal 14, which is a data string generated from the high-frequency attitude angle sensor detection signal 13 is generated by interpolating a gap between the data strings with the interpolation processing computation device 7 and then, by combining the low-frequency interpolation signal 15 and the high-frequency attitude detection signal 14 with the attitude data generator 8, the change in the attitude in a wide band ranging from the low frequency to the high frequency can be detected at a high precision.

Next, according to the second embodiment of the present invention, the low-frequency interpolation signal 15 is generated by applying the cubic spline interpolation to the interpolation processing with the interpolation processing computation device 7 according to the first embodiment.

FIG. 2 shows the relation between the low-frequency attitude detection signal 12 and the low-frequency interpolation signal 15, which is data having the same sampling cycle as the high-frequency attitude detection signal 14, obtained by carrying out the cubic spline interpolation on the low-frequency attitude detection signal 12. The cubic spline interpolation enables high-precision data interpolation by its operation of smoothing discrete data obtained at any sampling cycle. According to the second embodiment of the present invention, by interpolating a gap between data of the low-frequency attitude detection signal 12 with this cubic spline interpolation, missing data in the low-frequency attitude detection signal 12 is approximated, so that discrete data corresponding to the high-frequency attitude detection signal 14 can be generated while the accuracy of the low-frequency attitude detection signal 12 is maintained. At this time, the attitude data generator 8 can generate the high-precision attitude detection signal 16 by only adding the high-frequency attitude detection signal 14 corresponding to the sampling time to the low-frequency interpolation signal 15 generated by the interpolation processing computation device 7. Thus, the detection accuracy of the high-frequency attitude angle sensor detection signal 13 is reflected as the accuracy of the high-precision attitude detection signal 16.

According to a third embodiment of the present invention, the low-frequency interpolation signal 15 is generated by applying linear interpolation to interpolation processing of the interpolation processing computation device 7 and a difference between the high-frequency attitude detection signal 14 and the low-frequency interpolation signal 15 is obtained for each sample in the attitude data generator 8 of the first embodiment. Then, the differences are averaged in the unit of the sampling cycle of the low-frequency attitude detection signal so as to obtain an average of the differences. After that, an error between this average and the low-frequency interpolation signal 15 is added to the high-frequency attitude detection signal 14 for each angle sample data so as to generate the high-precision attitude detection signal 16.

FIG. 3 shows the relationship between the low-frequency attitude detection signal 12 and the low-frequency interpolation signal 15 obtained by carrying out linear interpolation on the low-frequency attitude detection signal 12, at the same sampling cycle as the high-frequency attitude detection signal 14. The linear approximate interpolation refers to interpolating data between samplings by connecting two discrete data obtained at any sampling cycle with a straight line. According to the third embodiment of the present invention, by interpolating data missing portion of the low-frequency attitude detection signal 12 which is discrete data by linear approximate interpolation, discrete data corresponding to the high-frequency attitude detection signal 14 can be introduced while the accuracy of the low-frequency attitude detection signal 12 is maintained.

FIG. 4 is a diagram for explaining meanings of errors $\omega_1$–$\omega_n$ of each sampling data for use upon adding the high-frequency attitude detection signal 14 to the low-frequency interpolation signal 15 in the attitude data generator 8. The high-frequency attitude detection signal 14 and the low-frequency interpolation signal 15 corresponding to the sampling cycle of the high-frequency attitude angle sensor detection signal 13 are inputted to the attitude data generator 8. At this time, the attitude data generator 8 splits those data at the sampling cycle of the low-frequency attitude detection signal 12 (assuming that the number of data contained in each cycle interval is n). Each data error at the same time contained therein is assumed to be $\Delta_1 \cdot \Delta_n$ and an average d of these is defined in a following equation. By adding this averaged to the high-frequency attitude detection signal 14, the high-precision attitude detection signal 16 is generated.

$$d = \frac{\Delta_1 + \Delta_2 + \cdots + \Delta_n}{n}$$

In case the linear approximate interpolation is applied to the interpolation processing computation device 7, its approximation error may affect correction of the high-frequency attitude detection signal 14 largely. However, according to the third embodiment of the present invention, the influence of this linear approximate interpolation is smoothed by introducing the error average d of the respective data, so as to restrict deterioration of the accuracy of the generated high-precision attitude detection signal 16.

According to the present invention, by combining the attitude determining device comprised of the conventional sequential Kalman filter with the interpolation processing computation device and the attitude data generator as described above, adding the low-frequency attitude detection signal with the high-frequency attitude detection signal detected by the high-frequency attitude angle sensor is facilitated, so that determination of the attitude of the artificial satellite at a high precision in wide band can be achieved.

What is claimed is:

1. An apparatus for detecting an attitude of an artificial satellite, comprising:

a telemetry data memory for storing and holding data from the artificial satellite;

an attitude angle calibration sensor data extracting device for extracting an attitude angle calibration sensor detection signal from said telemetry data memory as time-series data;

an angular velocity sensor data extracting device for extracting an angular velocity sensor detection signal from said telemetry data memory as time-series data;

a sequential Kalman filter computation device for generating an attitude angle determination signal from said attitude angle calibration sensor detection signal and said angular velocity sensor detection signal;

a low-pass filter computation device for generating a low frequency attitude detection signal from said attitude angle determination signal;

an interpolation processing computation device for generating a low frequency attitude interpolation signal from said low frequency attitude detection signal;

a high-frequency attitude angle sensor data extracting device for extracting a high-frequency attitude angle sensor detection signal from said telemetry data memory as time-series data;

a band pass filter computation device for generating a high-frequency attitude detection signal from said high-frequency attitude angle sensor detection signal; and an attitude data generator for generating a high-precision attitude detection signal from said low-frequency attitude interpolation signal and said high-frequency attitude angle detection signal.

2. The apparatus for detecting an attitude of an artificial satellite as set forth in claim 1, wherein said interpolation processing computation device generates said low-frequency attitude interpolation signal by interpolating said low-frequency attitude detection signal by cubic spline interpolation.

3. The apparatus for detecting an attitude of an artificial satellite as set forth in claim 1, wherein said interpolation processing computation device generates said low-frequency attitude interpolation signal by carrying out linear approximate interpolation on said low-frequency attitude detection signal, and said attitude data generator generates said high-precision attitude detection signal by interpolating said high-frequency attitude angle detection signal with an interpolation value of said low-frequency attitude detection signal outputted from said interpolation processing computation device.

4. A method for detecting an attitude of an artificial satellite, comprising:

a step of storing and holding data from the artificial satellite in a telemetry data memory;

an attitude angle calibration sensor data extracting step of extracting an attitude angle calibration sensor detection signal from said telemetry data memory as time-series data;

an angular velocity sensor data extracting step of extracting an angular velocity sensor detection signal from said telemetry data memory as time-series data;

a sequential Kalman filter computation step of generating an attitude angle determination signal from said attitude angle calibration sensor detection signal and said angular velocity sensor detection signal;

a low-pass filter computation step of generating a low frequency attitude detection signal from said attitude angle determination signal;

an interpolation processing computation step of generating a low frequency attitude interpolation signal from said low frequency attitude detection signal;

a high-frequency attitude angle sensor data extracting step of extracting a high-frequency attitude angle sensor detection signal from said telemetry data memory as time-series data;

a band pass filter computation step of generating a high-frequency attitude detection signal from said high-frequency attitude angle sensor detection signal; and an attitude data generation step of generating a high-precision attitude detection signal from said low-frequency attitude interpolation signal and said high-frequency attitude angle detection signal.

5. The method for detecting an attitude of an artificial satellite as set forth in claim 4, wherein said interpolation processing computation step further includes generating of said low-frequency attitude interpolation signal by interpolating said low-frequency attitude detection signal by cubic spline interpolation.

6. The method for detecting an attitude of an artificial satellite as set forth in claim 4, wherein said interpolation processing computation step further includes generating said low-frequency attitude interpolation signal by carrying out linear approximate interpolation on said low-frequency attitude detection signal, and said attitude data generation step includes generating said high-precision attitude detection signal by interpolating said high-frequency attitude angle detection signal with an interpolation value of said low-frequency attitude detection signal outputted from said interpolation processing computation device.

* * * * *